US011933104B2

(12) United States Patent
Chevalier

(10) Patent No.: US 11,933,104 B2
(45) Date of Patent: Mar. 19, 2024

(54) INDUSTRIAL DOOR LOCK

(71) Applicant: OnPoint Group, LLC, Perrysburg, OH (US)

(72) Inventor: Jeff A. Chevalier, Lewisburg, TN (US)

(73) Assignee: ONPOINT GROUP, LLC, Perrysburg, OH (US)

( * ) Notice: Subject to any disclaimer, the term of this patent is extended or adjusted under 35 U.S.C. 154(b) by 190 days.

(21) Appl. No.: 17/454,848

(22) Filed: Nov. 15, 2021

(65) Prior Publication Data

US 2022/0154528 A1 May 19, 2022

Related U.S. Application Data

(60) Provisional application No. 63/114,732, filed on Nov. 17, 2020.

(51) Int. Cl.
*E06B 9/80* (2006.01)
*E05B 63/00* (2006.01)

(52) U.S. Cl.
CPC ............ *E06B 9/80* (2013.01); *E05B 63/0052* (2013.01); *E06B 2009/801* (2013.01)

(58) Field of Classification Search
CPC .. E05B 65/0021; E05B 65/48; E05B 63/0052; E06B 9/80; E06B 2009/801; Y10S 292/53; Y10S 292/36; Y10S 292/55; Y10S 292/17; Y10T 292/1086; Y10T 292/31; Y10T 292/79
See application file for complete search history.

(56) References Cited

U.S. PATENT DOCUMENTS

2018/0305977 A1* 10/2018 Balay ........................ E06B 9/11

* cited by examiner

*Primary Examiner* — Christine M Mills
*Assistant Examiner* — Yahya Sidky
(74) *Attorney, Agent, or Firm* — Micheal E. Dockins; Shumaker, Loop & Kendrick, LLP

(57) ABSTRACT

A locking mechanism for use with a door structure having a corrugated surface includes a main body having a corrugated surface. The locking mechanism is configured to be adjustable between an unlocked position where the corrugated surface of the main body is not nested relative to the corrugated surface of the door structure and a locked position where the corrugated surface of the main body is nested relative to the corrugated surface of the door structure. The corrugated surface of the main body includes a plurality of engagement surfaces. Each of the engagement surfaces is configured to resist movement and/or deformation of the door structure with respect to a direction of movement of the door structure associated with the door structure being moved from a closed position towards an open position.

12 Claims, 3 Drawing Sheets

INDUSTRIAL DOOR LOCK

CROSS-REFERENCE TO RELATED APPLICATION

This patent application claims priority to U.S. Provisional Patent Application Ser. No. 63/114,732, filed on Nov. 17, 2020, the entire disclosure of which is hereby incorporated herein by reference.

FIELD

The present invention relates generally to a locking mechanism, and more particularly, to an industrial door locking mechanism for a rolling door assembly.

BACKGROUND OF THE INVENTION

Rolling steel doors are generally comprised of a plurality of coupled together slats allowing the door to be rolled into a cylindrical configuration and unrolled into a substantially planar configuration. Such a steel door may be installed to selectively cover or uncover an opening formed in a structure.

For example, FIG. 1 illustrates a typical rolling steel door 1 according to the prior art with the door 1 in a fully extended configuration corresponding to the door 1 closing off an associated opening. The door 1 includes a plurality of slats 2 extending laterally between a first vertically extending frame element 3 and a second vertically extending frame element 4. The door 1 includes a bottom bar 5 formed at a distal end of the door 1 configured to be disposed adjacent the ground surface when the door 1 is in the extended configuration. The bottom bar 5 includes a first sliding lock 6 configured to engage the first frame element 3 and a second sliding lock 7 configured to engage the second frame element 4, wherein the sliding locks 6, 7 are configured to selectively prevent an undesired opening of the door 1.

However, the configuration illustrated in FIG. 1 has been shown to be suspect to penetration for gaining undesired access through the door 1. Specifically, it has been found that a jacking up of the bottom bar 5 at a central position thereof can result in an upward bending of the slats 2 adjacent the bottom bar 5. This upward bending can result in a gap forming adjacent the bottom bar 5 through which access may be gained to the interior of the structure having the door 1. It has been found that this bending of the slats 2 can occur regardless of the engagement of the sliding locks 6, 7 with the frame members 3, 4 due to the configuration of the sliding locks 6, 7 failing to provide additional stiffness to the slats 2 with respect to the form of bending thereof described above.

It would accordingly be desirable to produce an industrial door lock configured to prevent the undesired bending of the slats forming the rolling door when the door is in a closed and locked configuration.

SUMMARY OF THE INVENTION

Consistent and consonant with the present invention, a locking mechanism configured to resist an undesired movement and/or deformation of a corrugated door structure has surprisingly been discovered.

According to an embodiment of the present invention, a locking mechanism for use with a door structure having a corrugated surface comprises a main body having a corrugated surface. The locking mechanism is configured to be adjustable between an unlocked position where the corrugated surface of the main body is not nested relative to the corrugated surface of the door structure and a locked position where the corrugated surface of the main body is nested relative to the corrugated surface of the door structure. In some embodiments, the main body is configured to be pivoted when adjusted between the unlocked position and the locked position. The main body may be pivotally connected to a frame element defining a side surface of a doorway associated with the door structure, such as by a hinged connection. The corrugated surface of the main body may be configured to be nested relative to the corrugated surface of the door structure at a position spaced from a lateral side surface of the door structure when the locking mechanism is in the locked position.

According to other aspects of the present invention, the main body may include a radial portion extending radially outwardly from an axis of rotation of the main body and a transverse portion extending transversely from the radially extending portion. The corrugated surface of the main body may be formed by a distal surface of the transverse portion spaced apart from the radial portion. For example, the main body may include an L-shape, wherein a first end of the L-shape is pivotally coupled to a frame element defining a side surface of a doorway associated with the door structure and a second end of the L-shape includes the corrugated surface of the main body.

According to further aspects of the present invention, the corrugated surface of the main body may include a plurality of engagement surfaces with each of the engagement surfaces facing towards a corresponding projection formed in the corrugated surface of the door structure when the locking mechanism is in the locked position. Each of the projections formed in the corrugated surface of the door structure may correspond to a position where a pair of slats are pivotally coupled to each other. Each of the engagement surfaces is configured to resist movement and/or deformation of the door structure with respect to a direction of movement of the door structure corresponding to the door structure being moved from a closed position towards an open position. Each of the engagement surfaces may be arranged transverse to the direction of movement of the door structure corresponding to the door structure being moved from the closed position towards the open position.

According to another aspect of the present invention, the main body may include a hasp opening formed therethrough. The hasp opening may be configured to receive a locking projection projecting from a frame element defining a side surface of a doorway associated with the door structure when the locking mechanism is in the locked position.

According to another embodiment of the present invention, a locking assembly for a door structure having a corrugated surface is disclosed. The locking assembly includes a first locking mechanism including a first main body having a corrugated surface. The first locking mechanism is configured to be adjustable between an unlocked position where the corrugated surface of the first main body is not nested relative to the corrugated surface of the door structure and a locked position where the corrugated surface of the first main body is nested relative to the corrugated surface of the door structure. The locking assembly further includes a second locking mechanism including a second main body having a corrugated surface. The second locking mechanism is configured to be adjustable between an unlocked position where the corrugated surface of the second main body is not nested relative to the corrugated surface of the door structure and a locked position where the corrugated surface of the second main body is nested relative to the corrugated surface of the door structure.

According to further aspects of the present invention, the first locking mechanism may be disposed along a first lateral side of the door structure and the second locking mechanism may be disposed along a second lateral side of the door structure disposed opposite the first lateral side thereof. The first locking mechanism may coupled to a first frame element extending along the first lateral side of the door structure and the second locking mechanism may be coupled to a second frame element extending along the second lateral side of the door structure.

BRIEF DESCRIPTION OF THE DRAWINGS

The above-mentioned, and other features and objects of the inventions, and the manner of attaining them will become more apparent and the invention itself will be better understood by reference to the following description of an embodiment of the invention taken in conjunction with the accompanying drawings, wherein.

DETAILED DESCRIPTION OF AN EMBODIMENT

Figure 1:
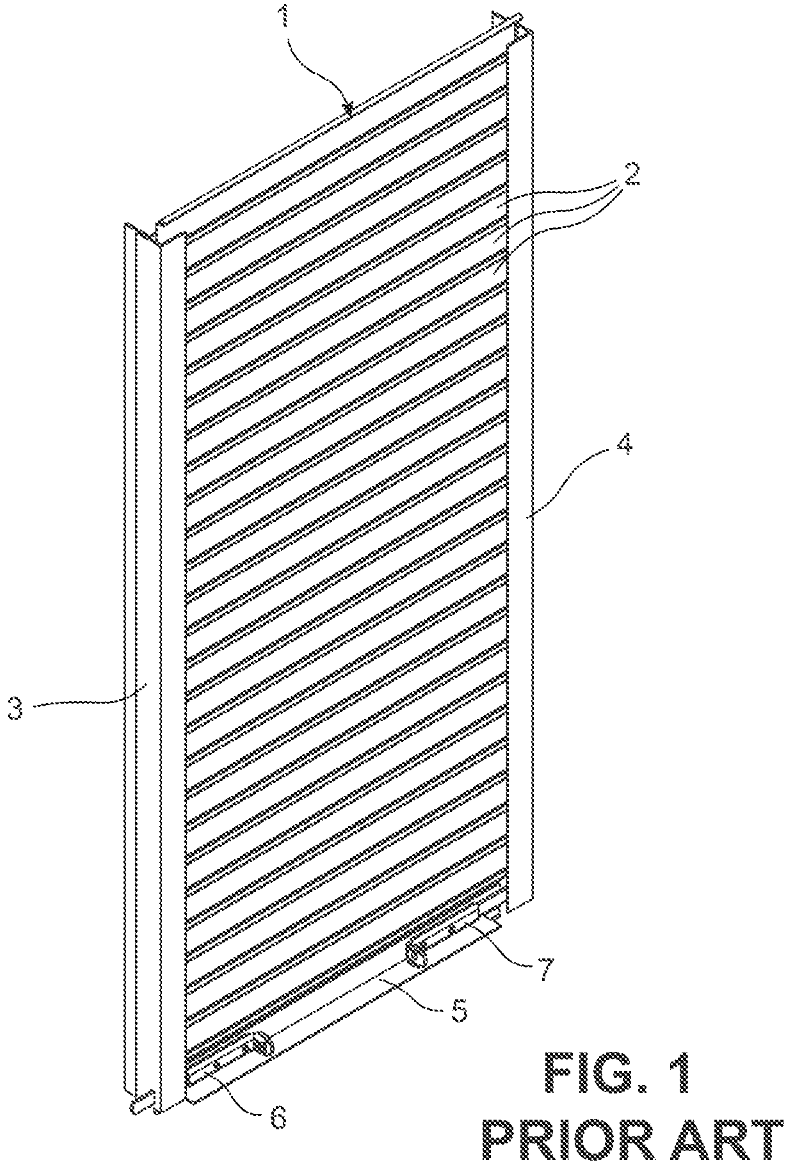
FIG. 1 PRIOR ART
FIG. 1 is a perspective view of a rolling metallic door assembly according to the prior art.

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

All documents, including patents, patent applications, and scientific literature cited in this detailed description are incorporated herein by reference, unless otherwise expressly indicated. Where any conflict or ambiguity may exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 3:
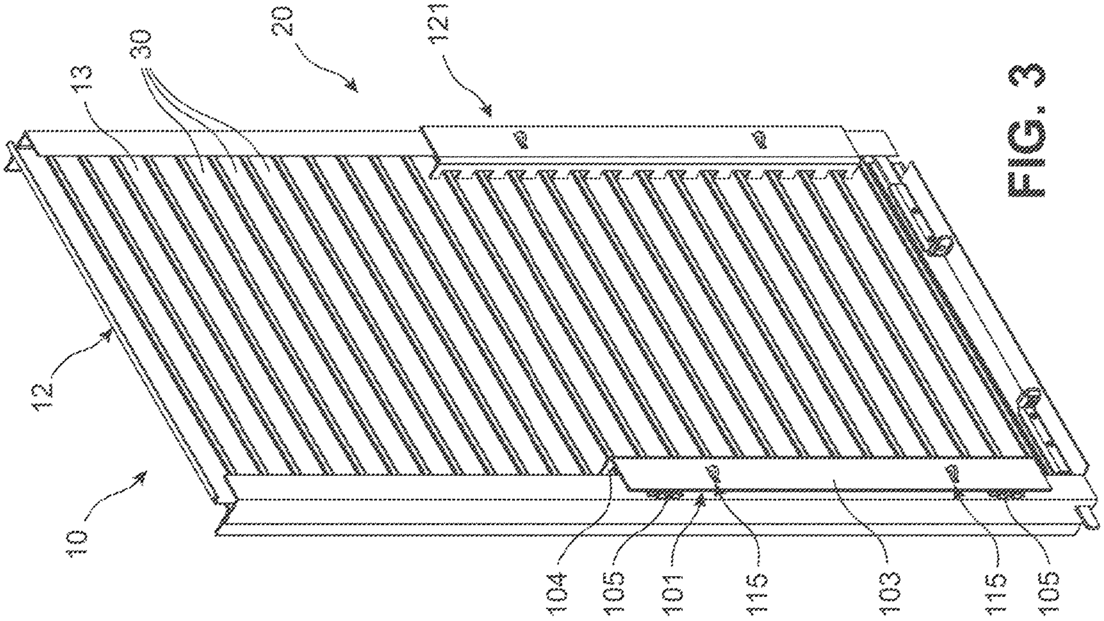
FIG. 3 is a perspective view of the rolling metallic door assembly of FIG. 2, wherein each of the locking mechanisms is in a locked position.
Figure 2:
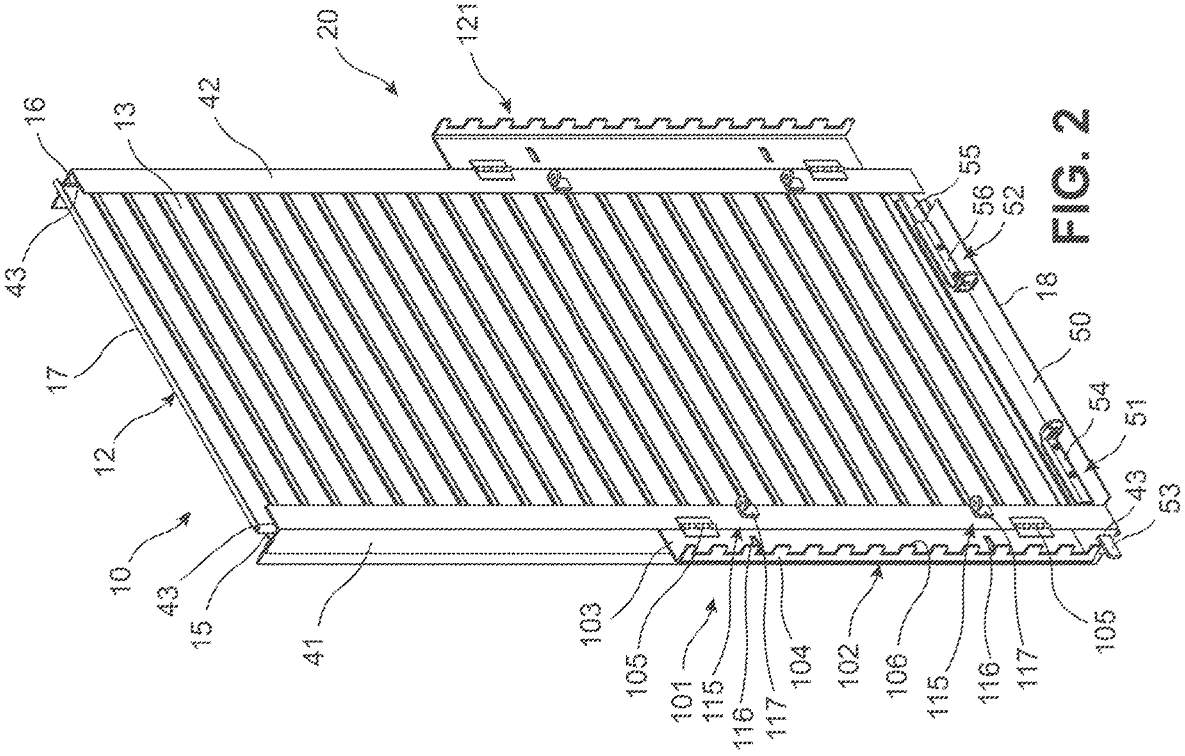
FIG. 2 is a perspective view of a rolling metallic door assembly having a locking assembly according to an embodiment of the present invention, wherein each of a pair of locking mechanisms comprising the locking assembly is in an unlocked position.

Referring now to FIGS. 2 and 3, a door assembly 10 having a locking assembly 20 according to an embodiment of the present invention is disclosed. The door assembly 10 may be representative of a rolling metallic (steel) door assembly, as one non-limiting example. The door assembly 10 as shown and described may be manufactured to include the locking assembly 20 or the locking assembly 20 may be integrated into an existing door assembly having the basic characteristics described hereinafter. In either event, the locking assembly 20 is configured to prevent an undesired deformation and/or movement of a door structure 12 of the door assembly 10 to prevent undesired passage through or around the door structure 12.

The door assembly 10 may be installed relative to an opening formed in a building structure such that the door structure 12 selectively forms a barrier with respect to the opening depending on an instantaneous position of the door structure 12. As used hereinafter, such an opening is referred to as a doorway. FIGS. 2 and 3 each show the door structure 12 when in a fully extended position for substantially covering the doorway formed through the corresponding building structure, which refers to a closed position of the door structure 12. Although not shown, the door structure 12 is configured to be adjusted to a retracted position corresponding to the door structure 12 no longer covering the doorway, which refers to an open position of the door structure 12.

The door structure 12 is shown in a configuration wherein the door structure 12 is moved vertically upwardly away from a ground surface when being adjusted away from the extended (closed) position and toward the retracted (open) position. However, it should be apparent to one skilled in the art that the door assembly 10 and the door structure 12 may be adapted to different orientations or configurations while still appreciating the beneficial features of the locking assembly 20 as disclosed herein. For example, the locking assembly 20 may be adapted for use with a horizontally adjustable door structure 12 without departing from the scope of the present invention, so long as the same interactions occur between the door structure 12 and the locking assembly 20 as described hereinafter.

In the example of the rolling metallic door assembly, the door structure 12 may be provided to include flexibility about a plurality of axes extending in a lateral direction of the door assembly 10 extending between opposing lateral sides of the doorway. Such flexibility ensures that the door structure 12 may be rolled into a substantially cylindrical configuration when adjusted from the extended position to the retracted position and then unrolled to a substantially planar configuration (shown in FIGS. 2 and 3) when adjusted from the retracted position to the extended position. However, the door structure 12 may alternatively be configured to be translatable relative to the doorway in the absence of the rolling thereof without necessarily departing from the scope of the present invention.

The door structure 12 generally includes a first major side 13, a second major side 14, a first lateral side 15, a second lateral side 16, a proximate end 17, and a distal end 18. The first major side 13 faces towards a first side of a wall structure (not shown) having the door assembly 10 installed therein and the second major side 14 is oppositely arranged to face towards a second side of the wall structure. The first lateral side 15 is configured to selectively extend along a first frame element 41 and the second lateral side 16 is oppositely arranged and configured to selectively extend along a second frame element 42. The proximate end 17 forms an end of the door structure 12 always spaced from the ground surface while the distal end 18 forms an end of the door structure 12 configured to engage the ground surface when the door structure 12 is in the extended position. The proximate end 17 may be an end of the door structure 12 that first rolls into a cylindrical shape when retracting the door structure 12, assuming the door structure 12 is a rolling metallic door as described herein.

Figure 6:
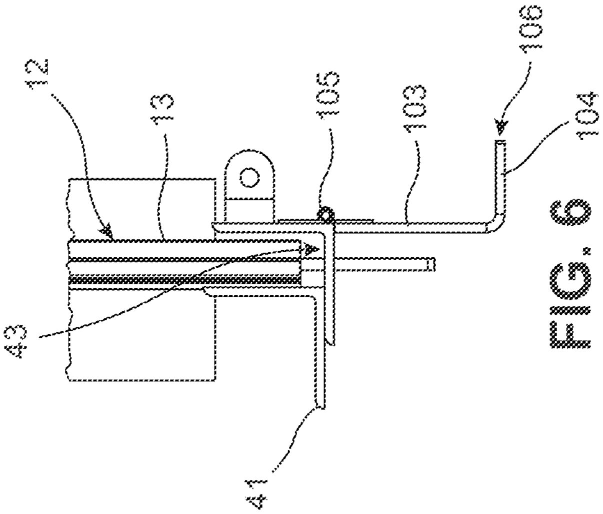
FIG. 6 is a fragmentary top plan view of one of the locking mechanisms of the rolling metallic door assembly, wherein the illustrated locking mechanism is in the unlocked position.
Figure 7:
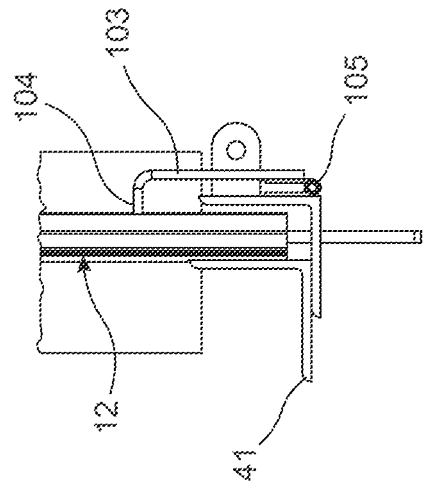
FIG. 7 is fragmentary top plan view of the one of the locking mechanisms shown in FIG. 6, wherein the illustrated locking mechanism is in the locked position.

The first frame element 41 and the second frame element 42 each extend vertically with the first frame element 41 defining a first lateral side of the doorway and the second frame element defining 42 a second lateral side of the doorway. The first frame element 41 may form a guide for guiding the first lateral side 15 of the door structure 12 when adjusted between the retracted and extended positions, and the second frame element 42 may form a guide for guiding the second lateral side 16 of the door structure 12 when adjusted between the retracted and extended positions. As shown in FIGS. 6 and 7 with respect to the first frame element 41, each of the frame elements 41, 42 may include a channel 43 formed therein with each of the channels 43 configured to receive the corresponding and facing lateral side 15, 16 of the door structure 12 therein. Each of the channels 43 may have a substantially U-shaped configuration to at least partially surround and guide the corresponding lateral side 15, 16 of the door structure 12 during the adjustment of the door structure 12 between the retracted and extended positons. The door structure 12 and each of the frame elements 41, 42 may include additional cooperating structures for prescribing the motion of the door structure 12 in addition to that shown and described without departing from the scope of the present invention, such as rails, tracks, rollers, sliders, or the like.

A ground surface on which the door assembly 10 rests defines a bottom of the doorway while a top of the doorway may be defined by a corresponding wall structure (not shown) or a mechanism (not shown) configured to adjust the door structure 12 between the retracted and extended positions.

Figure 5:
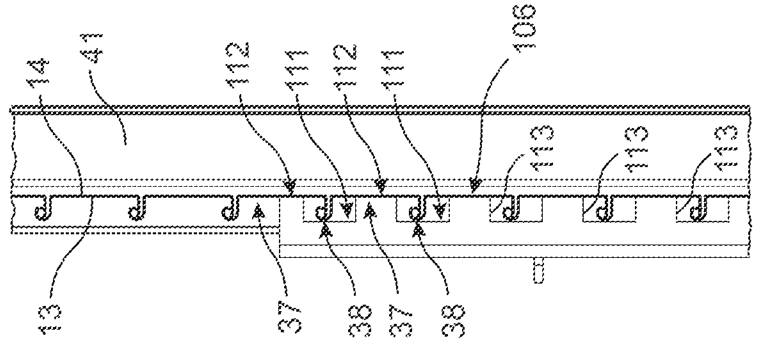
FIG. 5 is an elevational cross-sectional view of the rolling metallic door assembly taken from the perspective of FIG. 4, wherein the illustrated locking mechanism is in the locked position.
Figure 4:
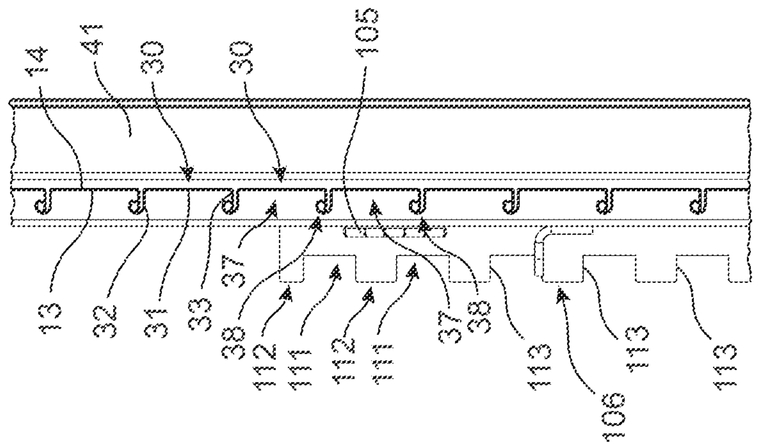
FIG. 4 is an elevational cross-sectional view of the rolling metallic door assembly of FIG. 2 as taken from a perspective arranged perpendicular to a plane of a door structure of the rolling metallic door assembly, wherein the illustrated locking mechanism is in the unlocked position.

The door structure 12 as shown is comprised of a plurality of slats 30 that are pivotally coupled to each other to form the flexibility of the door structure 12 about the plurality of laterally extending axes as described above. As best shown in FIGS. 4 and 5, each of the slats 30 may comprise a planar portion 31, a first coupling portion 32, and a second coupling portion 33, each of which extends longitudinally in the lateral direction of the door structure 12 between the opposing frame elements 41, 42. The first coupling portion 32 projects transversely from a first (upper) side of the planar portion 31 and the second coupling portion 33 projects transversely from a second (lower) side of the planar portion 31. Specifically, each of the coupling portions 32, 33 may project perpendicularly from the plane defined by the planar portion 31, as desired. The first coupling portion 32 of each of the slats 30 is pivotally coupled to the second coupling portion 33 of an adjacent one of the slats 30 such that the door structure 12 is configured to be pivotable about a laterally extending axis at each of the opposing longitudinal sides of each of the slats 30. The coupling portions 32, 33 may include cooperating structures for forming a hinged or other rotatable connection therebetween.

As shown in FIGS. 4 and 5, the repeating nature of the planar portions 31 and the cooperating coupling portions 32, 33 of the slats 30 results in the first major side 13 of the door structure 12 forming a corrugated surface including a plurality of indentations 37 formed by the recessed planar portions 31 and a plurality of projections 38 formed by the cooperating coupling portions 32, 33 (when the door structure 12 is in the planar configuration corresponding to the extended or closed position of the door assembly 10). That is, each of the corrugations extends longitudinally in the lateral direction of the door assembly 10 while adjacent ones of the corrugations are spaced from one another with respect to a direction of motion of the door structure 12 relative to the doorway when moving between the retracted and extending positions, which corresponds to the vertical direction in the present example.

The configuration of the door structure 12 as shown and described herein is not intended to be limiting, as alternative configurations of the door structure 12 having different slat configurations may be utilized so long as the resulting door structure 12 maintains the described corrugated surface including alternating indentations 37 and projections 38 with respect to one of the major sides thereof.

The distal end 18 of the door structure 12 may include a laterally extending end bar 50 coupled to a distally disposed one of the slats 30, wherein the end bar 50 forms a bottommost portion of the door structure 12 engaging the ground surface when the door structure 12 is in the extended and closed position. The end bar 50 may include an L-shaped cross-section, as desired.

The door structure 12 may include a first sliding lock 51 and a second sliding lock 52, wherein each of the sliding locks 51, 52 is configured to maintain the door structure 12 in the extended or closed position when each of the locks 51, 52 is selectively engaged with a corresponding one of the frame elements 41, 42. The first sliding lock 51 is disposed on the end bar 50 towards the first frame element 41 and the second sliding lock 51 is disposed on the end bar 50 towards the second frame element 42. The first sliding lock 51 includes a first sliding member 53 configured to slide relative to a guide 54 disposed on the end bar 50 with the sliding occurring in the lateral direction of the door assembly 10 towards or away from the first frame element 41. Similarly, the second sliding lock 52 includes a second sliding member 55 configured to slide relative to a guide 56 disposed on the end bar 50 with the sliding occurring in the lateral direction of the door assembly 10 towards or away from the second frame element 42. The first sliding member 53 is configured to be selectively received within a first laterally extending opening 43 formed through the first frame element 41 when slid theretowards while the second sliding member 55 is similarly configured to be selectively received within a second laterally extending opening (not shown) formed through the second frame element 42 when slid theretowards. Reception of either of the sliding members 53, 55 within either of the openings 43 is configured to prevent motion of the door structure 12 away from the extended or closed configuration shown in FIGS. 2 and 3, and more specifically, motion of the end bar 50 away from the ground surface.

The locking assembly 20 as shown in FIGS. 2-7 includes a first locking mechanism 101 corresponding to the first frame element 41 as well as a second locking mechanism 121 corresponding to the second frame element 42. As can be seen in FIGS. 2 and 3, the first locking mechanism 101 is arranged substantially symmetrically relative to the second locking mechanism 121 with respect to a plane arranged perpendicular to a plane defined by the door structure 12 and otherwise includes identical structure, hence only the structure of the first locking mechanism 101 is described in extensive detail hereinafter. Specifically, the description hereinafter of each feature and/or component described as forming the first locking mechanism 101 is also descriptive of a corresponding feature and/or component of the second locking mechanism 121 that operates in the same fashion, despite being oriented oppositely due to the opposing position of the locking mechanisms 101, 121.

The first locking mechanism 101 includes a main body 102 having a first portion 103 and a second portion 104. The first portion 103 and the second portion 104 are each shown as being formed from a substantially planar arranged and thin-walled or plate-like structure, but the first portion 103 and the second portion 104 may include alternative configurations without necessarily departing from the scope of the present invention. The entirety of the main body 102 including the first portion 103 and the second portion 104 may be formed integrally or monolithically in a common manufacturing process, as desired. In other embodiments, the first portion 103 may be rigidly and securely coupled to the second portion 104, as desired.

The first portion 103 of the main body 102 is pivotally coupled to the first frame element 41 such that the main body 102 can pivot relative to the first frame element 41 about a vertically extending axis of rotation. The pivotal coupling of the first portion 103 to the first frame element 41 is shown in FIGS. 2-7 as occurring via at least one hinged connection 105 formed between the first portion 103 and the first frame element 41. The first locking mechanism 101 is shown as including a pair of the hinged connections 105 spaced apart from one another with respect to the vertical direction, but any number of the hinged connections 105 may be utilized while remaining within the scope of the present invention. Each of the hinged connections 105 may be positioned relative to the first portion 103 such that the axis of rotation of the first locking mechanism 101 is disposed adjacent an end of the first portion 103 arranged opposite an end thereof where the first portion 103 meets the second portion 104. The first portion 103 may alternatively be referred to as the radial portion 103 or radially extending portion 103 of the main body 102 by virtue of the manner in which the first portion 103 spaces the second portion 104 of the main body 104 from the axis of rotation defined by the hinged connections 105 with respect to a radial direction originating from the axis of rotation.

The second portion 104 extends transversely from the end of the first portion 103 arranged opposite the end of the first portion 103 having the hinged connections 105 to cause a distal surface 106 of the second portion 104 to be offset from the radial direction defined by the first portion 103. That is, the distal surface 106 of the second portion 104 is offset angularly relative to the radial direction of the first portion 103. The second portion 104 may alternatively be referred to as the transverse portion 104 of the main body 102 by virtue of the manner in which the second portion 104 extends transversely from the first portion 103. The transverse arrangement of the first portion 103 relative to the second portion 104 may include the first portion 103 arranged perpendicular relative to the second portion 104, as desired. The perpendicular arrangement present between the portions 103, 104 may result in the main body 102 having an L-shape, although other configurations may be utilized.

The first locking mechanism 101 is adjustable between a locked position (FIGS. 3, 5, and 7) and at least one unlocked position (FIGS. 2, 4, and 6). The locked position of the first locking mechanism 101 includes the distal surface 106 of the transverse portion 104 positioned relative to the corrugated profile of the first major side 13 of the door structure 12 such that at least a portion of the distal surface 106 is configured to engage at least a portion of the corrugated profile of the first major side 13 of the door structure 12 when an attempt is made to move and/or deform the door structure 12 away from the fully extended and closed position thereof as shown in FIGS. 2 and 3. For example, as mentioned in the background of the present invention, it has been discovered that an upward deformation of the slats 30 adjacent the ground surface, such as by prying, can result in the projections 38 of the door structure 12 moving along the prescribed direction of movement of the door structure 12, wherein the direction of movement of the door structure 12 corresponds to the vertical direction in the present example. The locked position accordingly includes the potential for mechanical engagement and interference between the distal surface 106 and the corrugated surface of the door structure 12 during an attempt to penetrate the door assembly 10. In contrast, the unlocked positions may refer to any of the positions of the distal surface 106 wherein the distal surface 106 has been rotated away from the first major side 13 of the door structure 12 to prevent the possibility of such mechanical interference, such as when it is desirable to adjust the position of the door structure 12 relative to the doorway for opening or closing the doorway. The exemplary unlocked position shown in the figures includes the first or radial portion 103 rotated 180 degrees away from the illustrated locked position, but the unlocked position may include the portion 103 rotated any angle away from the locked position so long as the described mechanical engagement and interference is not present between the distal surface 106 and the door structure 12, such as a 90 degree rotation from the illustrated position.

The distal surface 106 of the second portion 104 forms a corrugated surface including an alternating pattern of indentations 111 and projections 112. The distal surface 106 may accordingly be alternatively referred to as the corrugated surface 106 of the second portion 104. In the present example, the distal surface 106 includes a rectangular wave configuration wherein each of the indentations 111 is formed by a rectangular cut-out and each of the projections 112 is formed by a rectangular segment of the distal surface 106 present between adjacent ones of the indentations 111. Each of the projections 112 defines an engagement surface 113 thereof. Each of the engagement surfaces 113 refers to a surface of each of the projections 112 configured to engage one of the projections 38 of the door structure 12 when the above-mentioned mechanical engagement and interference is occurring, such as during an attempt to penetrate the door assembly 10. In the present example, each of the engagement surfaces 113 is formed by a downwardly facing surface of each of the projections 112 positioned to face towards and potentially (depending on the circumstances) contact an upwardly facing surface of one of the projections 38 when the first locking mechanism 101 is in the locked position. Generally, each of the engagement surfaces 113 is arranged to face in a direction that is arranged opposite a direction of movement of the slats 30 when deformed away from the closed position of the door assembly 10 as described herein.

The illustrated rectangular wave configuration may be replaced with alternative corrugated profiles having alternating indentations and projections while remaining within the scope of the present invention, so long as the relationships described hereinabove are maintained with respect to the manner in which the first locking mechanism 101 interacts with the door structure 12. For example, the cut-outs forming the indentations 111 may be formed to be semi-circular or semi-elliptical in shape, or the indentations 111 may have shapes and configurations that are substantially complimentary in shape and position to the projections 38 extending from the door structure 12, so long as the distal surface 106 is provided with at least one engagement surface 113 configured to engage at least one of the projections 38 when the first locking mechanism 101 is in the locked position and the door structure 12 is being deformed and/or moved undesirably in the manner described herein.

The main body 102 is positioned on the first frame element 41 with respect to the vertical direction such that each of the indentations 111 formed in the distal surface 106 is at a height that corresponds to one of the projections 38 formed in the first major surface 13 of the door structure 12 while each of the projections 112 formed in the distal surface 106 is at a height that corresponds to one of the indentations 37 formed in the first major surface 13 of the door structure 12, assuming the door structure 12 is in the extended and closed position shown in FIGS. 2 and 3. As shown by comparison of FIGS. 2, 4, and 6 to FIGS. 3, 5, and 7, the first locking mechanism 101 is adjusted from the unlocked position to the locked position by rotating the main body 102 about the hinged connections 105 until the distal surface 106 is positioned for engagement with the projections 38 of the door structure 12 due to the engagement surfaces 113 overlapping with the projections 38 with respect to the direction of movement of the door structure 12 (the vertical direction in the present example). The locked position may accordingly be said to include the corrugated surface 106 of the first locking mechanism 101 being nested relative to the corrugated surface formed by the door structure 12, whereas the unlocked position is devoid of such nesting. The locked position may also include the projections 111 disposed adjacent or directly engaging the planar portion 31 of each of the slats 30, as desired, so long as the described interference pattern of the distal surface 106 is maintained. The first locking mechanism 101 is similarly adjusted from the locked position to the unlocked position by rotating the distal surface 106 away from the first major side 13 of the door structure 12.

The first locking mechanism 101 further includes at least one hasp assembly 115 with each of the hasp assemblies 115 including a hasp opening 116 formed in the first radially extending portion 103 of the main body 102 and a corresponding locking projection 117 projecting from the first frame element 41. Each of the locking projections 117 includes a through opening configured to receive a locking device such as a padlock therethrough. Each of the locking projections 117 is positioned such that rotation of the main body 102 from the unlocked position to the locked position includes the reception of each of the locking projections 117 within a corresponding one of the hasp openings 116 such that the use of a padlock with respect to the corresponding through opening maintains the first locking mechanism 101 in the locked position. The first locking mechanism 101 is shown in FIGS. 2 and 3 as having a pair of the hasp assemblies 115, but any number of the hasp assemblies 115 may be utilized while remaining within the scope of the present invention. Additionally, it should be apparent to one skilled in the art that other similar latching mechanisms or locking mechanisms may be utilized to maintain the rotational position of the main body 102 relative to the first frame element 41 while remaining within the scope of the present invention, as desired.

In use, the door assembly 10 is adjusted to the extended or closed position as shown in FIGS. 2 and 3 where the end bar 50 of the door structure 12 is engaging the ground surface. The first sliding lock 51 and the second sliding lock 52 may each be adjusted to a position for preventing motion of the door structure 12 relative to the frame elements 41, 42. The first locking mechanism 101 and the second locking mechanism 121 are then each adjusted from the unlocked position to the locked position with each of the corresponding engagement surfaces 113 of each of the locking mechanisms 101, 121 facing towards a corresponding one of the projections 38 projecting from the door structure 12. Each of the hasp assemblies 115 may also receive a padlock or other locking device once the locking mechanisms 101, 121 are moved to the respective locked positions as described above.

In the event of an undesired attempt at entry through the door assembly 10, such as by an upward prying of the end bar 50, each of the locking mechanisms 101, 121 is configured to prevent a deformation of the door structure 12 that could allow for entry through the doorway. Specifically, any upward deformation and/or movement of the door structure 12, as could be caused by the upward deformation of those slats 30 adjacent the end bar 50, results in one or more of the engagement surfaces 113 engaging the corresponding projections 38 formed in the corrugated surface provided by the slats 30. The contact present between the engagement surfaces 113 and the projections 38 stiffens each of the corresponding slats 30 from further deformation as each of the engagement surfaces 113 counteracts any upward forces applied thereto as would be present during an upward prying of the door structure 12, which maintains the door structure 12 in the closed configuration shown in FIGS. 2 and 3. The use of the locking mechanisms 101, 121 according prevents the type of upward deformation of the door structure 12 that may otherwise still be possible even in the event that the end bar 50 of the door structure 12 is secured in position to the frame elements 41, 42 by the corresponding sliding locks 51, 52, as such point contacts are too remote to the positions potentially experiencing such deformation.

The locking mechanisms 101, 121 also prevent undesired entry through the lateral sides of the doorway formed by the door assembly 10. First, the adjustment of each of the locking mechanisms 101, 121 to the locked position results in a physical barrier being present at each position where one of the lateral sides 15, 16 of the door structure 12 is received within the corresponding one of the frame elements 41, 42. This physical barrier prevents lateral access to the lateral sides 15, 16 of the door structure 12 along a range of heights of the door assembly 10 adjacent the ground surface. This barrier may prevent access of a pry bar between the lateral sides 15, 16 of the door structure 12 and the corresponding one of the frame elements 41, 42, which in turn prevents a deformation of the door structure 12 in a direction towards the other of the frame elements 41, 42 or a bending of the door structure 12 out of the plane of the door structure 12 at the corresponding lateral side 15, 16. Second, the manner in which the projections 112 of each of the locking mechanisms 101, 121 engage the door structure 12 at multiple locations provided on a common plane prevents any undesired deformation of the door structure 12 in a direction towards the locking mechanisms 101, 121, as may occur during certain attempts to deform the door structure 12. The locking mechanisms 101, 121 accordingly prevent motion or deformation of the door structure 12 in a variety of different directions as may be experienced during various different attempts at penetrating the door assembly 10 from various different positions or orientations.

The locking assembly 20 may be provided with only one of the locking mechanisms 101, 121 associated with only one of the opposing frame elements 41, 42 while remaining within the scope of the present invention. Each of the locking mechanisms 101, 121 may also be provided with a radially extending portion having an desired radial length in order to position the engagement surfaces 113 of the distal surface 106 at any position relative to the projections 38 of the door structure 12 with respect to the lateral direction of the door assembly 10. For example, the radial length of each of the radially extending portions may be selected to reinforce the slats 30 at or adjacent an expected point of deformation, which may be spaced from the corresponding lateral side surface 15, 16 of the door structure 12. The main body of each of the locking mechanisms 101, 121 may also be modified to include any number of the transverse portions extending transversely from different radial positions of the radially extending portion while remaining within the scope of the present invention, wherein a distal surface of each of the transverse portions may include a corrugated profile for forming the necessary engagement surfaces. For example, rather than the disclosed L-shape, each of the main bodies may include an F-shape, thereby allowing for the door structure 12 to be reinforced at multiple lateral positions with respect to a single locking mechanism 101, 121.

The locking mechanisms 101, 121 may also be modified from a configuration including the disclosed pivotal connection of each of the locking mechanisms 101, 121 to each of the frame elements 41, 42 while still maintaining the beneficial features of the engagement surfaces 113 and the resulting mechanical interference the engagement surfaces 113 provide. For example, each of the main bodies may be configured to be translatable or otherwise adjustable in each of a depth direction and the lateral direction of the door assembly 10 to position the corresponding engagement surfaces 113 relative to the projections 38 in the manner described when adjusting the corresponding mechanism from an unlocked to a locked configuration, so long as the corresponding corrugated surfaces mate in the manner described herein.

The locking assembly 20 as shown and described herein can beneficially be retrofit to an existing door assembly or may be manufactured as a part of a new door assembly to be installed into a wall structure. For example, with reference to FIGS. 2 and 3, it can be seen that the locking mechanisms 101, 121 may be easily added to an existing pair of the frame elements 41, 42 by coupling a hinge plate (leaf) of each of the hinged connections 105 to the corresponding one of the frame elements 41, 42 with the other hinge plate of each of the hinged connections 105 coupled to the corresponding main body 102. One of the locking projections 117 may also be coupled to the corresponding one of the frame elements 41, 42 at a position corresponding to one of the hasp openings 116 when the corresponding main body 102 is adjusted to the locked position. Alternatively, the locking assembly 20 may be integrated into the structure of the door assembly 10 when first installed into the corresponding building structure, including the potential to install each of the locking mechanisms 101, 121 into the corresponding frame elements 41, 42 prior to installation of the frame elements 41, 42. The disclosed locking assembly 20 may accordingly be easily and quickly integrated into a new or an existing door assembly 10 without otherwise altering the basic structure or manner of operation of the door assembly 10.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A locking mechanism for use with a door structure having a corrugated surface, the locking mechanism comprising:

a main body having a corrugated surface, the locking mechanism configured to be adjustable between an unlocked position where the corrugated surface of the main body is not nested relative to the corrugated surface of the door structure and a locked position where the corrugated surface of the main body is nested relative to the corrugated surface of the door structure, wherein the main body is configured to be pivoted when adjusted between the unlocked position and the locked position, wherein the main body has an L-shape, wherein a first end of the L-shape is pivotally coupled to a frame element defining a side surface of a doorway associated with the door structure and a second end of the L-shape includes the corrugated surface of the main body.

2. The locking mechanism of claim 1, wherein the main body is pivotally connected to a frame element defining a side surface of a doorway associated with the door structure.

3. The locking mechanism of claim 2, wherein the main body is pivotally connected to a frame element by a hinged connection.

4. The locking mechanism of claim 1, wherein the main body includes a radial portion extending radially outwardly from an axis of rotation of the main body and a transverse portion extending transversely from the radially extending portion.

5. The locking mechanism of claim 4, wherein the corrugated surface of the main body is formed by a distal surface of the transverse portion.

6. The locking mechanism of claim 1, wherein the corrugated surface of the main body is configured to be nested relative to the corrugated surface of the door structure at a position spaced from the side surface of the door structure when the locking mechanism is in the locked position.

7. A locking mechanism for use with a door structure having a corrugated surface, the locking mechanism comprising:

a main body having a corrugated surface, the locking mechanism configured to be adjustable between an unlocked position where the corrugated surface of the main body is not nested relative to the corrugated surface of the door structure and a locked position where the corrugated surface of the main body is nested relative to the corrugated surface of the door structure, wherein the corrugated surface of the main body includes a plurality of engagement surfaces, wherein each of the engagement surfaces faces towards a corresponding projection formed in the corrugated surface of the door structure when the locking mechanism is in the locked position.

8. The locking mechanism of claim 7, wherein each of the projections formed in the corrugated surface of the door structure corresponds to a position where a pair of slats of the door structure are pivotally coupled to each other.

9. The locking mechanism of claim 7, wherein each of the engagement surfaces is configured to resist movement and/or deformation of the door structure with respect to a direction of movement of the door structure corresponding to the door structure being moved from a closed position towards an open position.

10. The locking mechanism of claim 7, wherein each of the engagement surfaces is arranged transverse to a direction of movement of the door structure corresponding to the door structure being moved from a closed position towards an open position.

11. A locking mechanism for use with a door structure having a corrugated surface, the locking mechanism comprising:

a main body having a corrugated surface, the locking mechanism configured to be adjustable between an unlocked position where the corrugated surface of the main body is not nested relative to the corrugated surface of the door structure and a locked position where the corrugated surface of the main body is nested relative to the corrugated surface of the door structure, and wherein the main body includes a hasp opening formed therethrough.

12. The locking mechanism of claim 11, wherein the hasp opening is configured to receive a locking projection projecting from a frame element defining a side surface of a doorway associated with the door structure when the locking mechanism is in the locked position.

* * * * *